US005133919A

United States Patent [19]

Hasegawa et al.

[11] Patent Number: 5,133,919

[45] Date of Patent: Jul. 28, 1992

[54] APPARATUS FOR DISPOSING OF A USED THERMAL STENCIL MASTER SHEET AND A PROCESS FOR DISPOSING OF THE SAME

[75] Inventors: Takanori Hasegawa; Shoichi Ikejima, both of Tokyo, Japan

[73] Assignee: Riso Kagaku Corporation, Tokyo, Japan

[21] Appl. No.: 647,602

[22] Filed: Jan. 29, 1991

[30] Foreign Application Priority Data

Feb. 2, 1990 [JP] Japan .................................... 2-23952

[51] Int. Cl.[5] .............................................. B29C 35/00

[52] U.S. Cl. .................................... 264/230; 101/114; 264/DIG. 66; 264/DIG. 71; 264/342 R; 271/307; 271/311

[58] Field of Search ................ 271/307, 311; 264/230, 264/342 R, DIG. 66, DIG. 71; 101/114

[56] References Cited

U.S. PATENT DOCUMENTS 4,628,813 12/1986 Hasegawa et al. .................. 101/116
4,641,948 2/1987 Nakahata et al. ................... 271/307
4,761,667 8/1988 Miyai et al. ......................... 271/311
4,966,073 10/1990 Hasegawa et al. .................. 101/120

*Primary Examiner*—David A. Simmons
*Assistant Examiner*—Merrick Dixon
*Attorney, Agent, or Firm*—Fay, Sharpe, Beall, Fagan, Minnich & McKee

[57] ABSTRACT

An apparatus for disposing of a used thermal stencil master sheet, in a superior disposing efficiency and secret-retainability, and a process for disposing of the same are provided, which apparatus is provided with a stripping nail for stripping a used thermal stencil master sheet wound up on a stencil body therefrom, a waste stencil box for encasing the stripped master sheet and rolls for waste stencil for feeding the master sheet into the box, and is characterized by providing a means for heating the master sheet so that it is heat-shrinked and-/or melted within the box, and which process comprises discarding the used master sheet of a thermal stencil master sheet, and heating the used master sheet so as to subject it to heat-shrinkage and/or melting.

4 Claims, 2 Drawing Sheets

APPARATUS FOR DISPOSING OF A USED THERMAL STENCIL MASTER SHEET AND A PROCESS FOR DISPOSING OF THE SAME

BACKGROUND OF THE INVENTION

1. Field of the Invention

This invention relates to an apparatus for disposing of a used thermal stencil master sheet and a process for disposing of the same. More particularly, it relates to an apparatus for disposing of a used thermal stencil master sheet (hereinafter referred to as waste stencil) in a superior disposing efficiency and with secret-retainability, and a process for disposing of the same.

2. Description of the Related Art

There has been known a thermal stencil master sheet obtained by laminating a thermoplastic resin film onto a porous substrate such as a porous thin paper and further providing a release agent layer on the surface of the film for preventing melt-adhesion of the film to a manuscript or a thermal head. In the case where stencil making is carried out using such a thermal stencil master sheet, a manuscript is closely attached onto the surface of the film of the stencil master sheet, followed by irradiating infrared rays or a xenon flash light thereto from the side of the perforated substrate of the thermal stencil master sheet to generate heat at the black image part of the manuscript, melt-perforating the film of the thermal stencil master sheet by the generated heat and thereafter stripping the manuscript from said stencil master sheet. Alternatively, the image of a manuscript is read by an image sensor, followed by melt-perforating the film of said stencil master sheet by the heat of thermal head just as the image is. Recently, the thermal stencil master sheet which is perforated by means of thermal head is rapidly prevailing because of its convenience in making even digital images.

However, printing using thermal stencil master sheets is often carried out in where many lots or jobs require only a small number of prints of each stencil master. As such, a large quantity of waste stencils are formed, so that a large space is required for encasing them. Further, when the above master sheet has been printed, there are many cases where secret retention is required for like examination papers at school, etc., so that it is the present status that a special care is required for disposal of such waste stencil.

SUMMARY OF THE INVENTION

The object of the present invention is to provide an apparatus for disposing of a used thermal stencil master sheet, having dissolved the above-mentioned problems of the prior art, and having a superior encasing capability and secret-retainability for the resulting waste stencil after completion of printing using a thermal stencil master sheet, and a process for disposing of the same.

The present invention in the first aspect resides in an apparatus for disposing of a used thermal stencil master sheet, which comprises a stripping means for stripping a used thermal stencil master sheet wound up on a stencil body, a box for encasing the stripped master sheet, a feed means for feeding the master sheet to the inside of the box, and a heating means for heating the master sheet so that it is shrunk and/or melted within the box.

In the apparatus of the present invention, the above feed means is preferred to be a pair of feed rolls provided at an opening of said box, said stripping means is preferred to be a nail journaled to the axis of one of the feed rolls, and said heating means is preferred to be a heater provided at at least one of the feed rolls.

The present invention in the second aspect resides in a process for disposing of a used thermal stencil master sheet obtained by laminating a thermoplastic resin film onto a porous substrate, which comprises a step of discarding a used thermal stencil sheet, a step of heating the discarded thermal stencil sheet so as to subject it to heat-shrinkage and/or melting, and a step of discharging a heat-shrinked and/or melted material.

In the process of the present invention, the thermal stencil sheet is preferred to comprise a non-woven fabric obtained by means of spun-bonding or melt-blowing of polypropylene as a substrate and a polyester film as a thermoplastic resin film.

DETAILED DESCRIPTION OF PREFERRED EMBODIMENTS

An example of the thermal stencil master sheet obtained by applying a thermoplastic synthetic resin film onto a porous substrate and used in the present invention, is the one wherein the heat energy imparted by a thermal head at the time of digital stencil-making has no influence upon its mechanical dimensional, and after completion of stencil-printing, the whole or a part of the resulting master sheet is heat-shrunk and/or melted by uniform heating. At least one of the porous substrate and the thermoplastic synthetic resin film is sufficient to be heat-shrunk and/or melted by uniform heating.

As the above porous substrate, wet type non-woven fabrics wherein natural fibers such as Manila hemp, Kozo (paper mulberry), Mitsumata (*Edgeworthia papyriferd*), pulp, etc., or synthetic fibers such as polyester fibers, nylon fibers, etc. are used alone or in admixture, dry type non-woven fabric obtained by means of spun bonding, melt-blowing, etc., screens composed of nylon fibers, polyester fibers, etc. or the like may be used. Among these, non-woven fabrics prepared by subjecting polypropylene resin to melt-blowing or spun bonding may be preferably used. The substrates have usually a thickness of 10 to 60 $\mu m$.

Examples of the above thermoplastic synthetic resin film are polyester film, polycarbonate film, polypropylene film, polyvinyl chloride film, polyvinyl chloridevinylidene chloride copolymer film, etc. Among these, those affording a clear image by impressing a low energy and having a superior adhesion onto the substrate are preferred.

In the present invention, for applying the thermoplastic synthetic resin film onto the porous substrate, known processes are applicable. For example, hot-melt-adhesion or processes using emulsion or solution adhesives of polyvinyl acetate resin, polyacrylic acid ester resin, etc., reactive adhesives, etc. may be employed.

Further, the thermal stencil master sheet used in the present invention may have a melt adhesion preventive layer for preventing adhesion of the melt of the film onto a heat-generating element such as thermal head, etc., composed of surfactants of known silicone compounds, fluorine compounds, or fatty acid compounds, etc.

Figure 1:
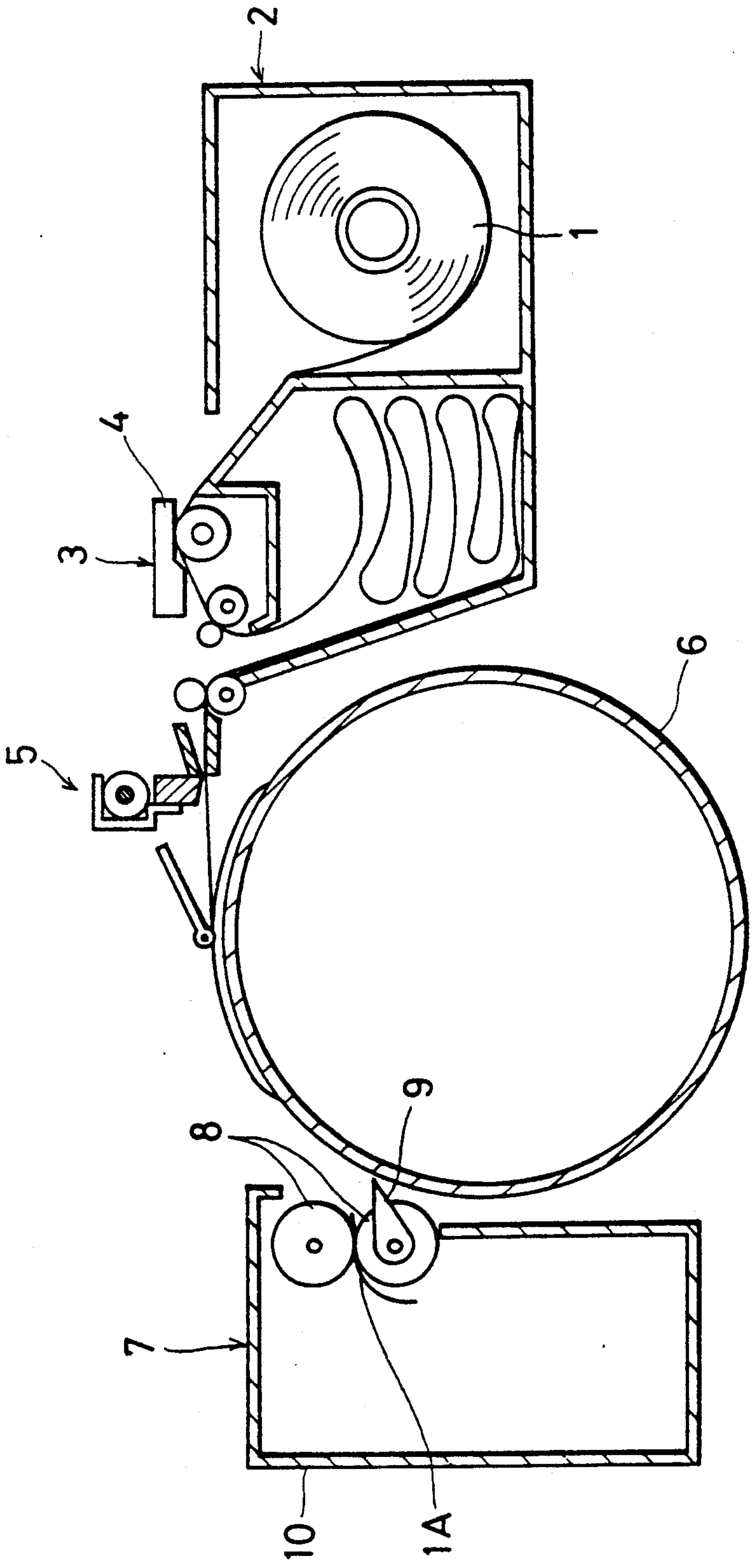
FIG. 1 shows a schematic crosssectional view illustrating a stencil-printing apparatus having a waste stencil apparatus incorporated therein, as an embodiment of the present invention.

FIG. 1 shows a schematic crosssectional view illustrating a stencil-printing apparatus having an apparatus for disposing of used stencils, incorporated therein, as an embodiment of the present invention.

This apparatus is composed of a master sheet-storing section 2 encasing a roll of thermal stencil master sheet 1, a stencil-making means 3 where the master sheet 1 is perforated by thermal head 4, a master sheet-cutter 5 for cutting the perforated master sheet 1 to a definite length, a cylindrical stencil body 6 where the stencil-printing master sheet is wound up thereon and printed with a printing ink fed from the inside part, a means for feeding a printing paper and a means for discharging the paper, each provided under the stencil body 6 (not shown), and a means for disposing of waste stencil 1A by stripping the master sheet 1 after completion of printing and encasing it as a waste stencil 1A. An apparatus for disposing of the waste stencil 7 is provided with a nail 9 for stripping the master sheet 1 from the stencil body 6 and pinch rolls 8 for leading the waste stencil 1A to a waste stencil box 10, provided with a heating means, which rolls functioning both as feed roll and heating roll for the waste stencil 1A.

In such a construction, the thermal stencil master sheet 1 encased in the master sheet-storing section 2 is led to stencil-making means 3 so that the surface of heat-sensitive thermoplastic film can be positioned above, and melt-perforated by means of thermal head 4. The resulting perforated master sheet 1 is cut to a definite length by means of master sheet-cutter 5 and wound up on a cylindrical stencil body 6, followed by printing. After completion of printing, the master sheet 1 is stripped from the stencil body 6, by means of a master sheet-stripping nail 9 provided at the disposing means 7 for the waste stencil and entered in the disposing means 7.

In the means 7 for disposing of the waste stencil, the waste stencil 1A is discharged into the waste stencil box 10, while it is uniformly heated by means of the rolls 8 functioning both as heating rolls and waste stencil feeding rolls. The temperature of the rolls 8 functioning both as heating rolls and waste stencil feeding rolls may be suitably set depending on the porous substrate and the raw material of the heat-sensitive thermoplastic film. As to the heating method, a heating roll and a counter roll may be used in a pair, or a pair of heating rolls may be used. The waste stencil 1A having passed through the rolls 8 is uniformly heated, shrinks and/or melts partly or wholly, so that the information on the waste stencil can be erased, and since volume of the master sheet can be reduced, it is possible to increase the quantity of the waste stencil encased in the waste stencil box 10.

Figure 2:
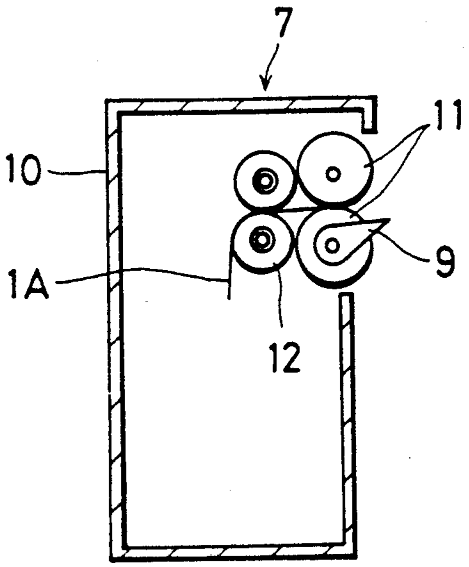
FIGS. 2 and 3 each show a schematic crosssectional view illustrating a waste stencil apparatus as other embodiments of the present invention.
Figure 3:
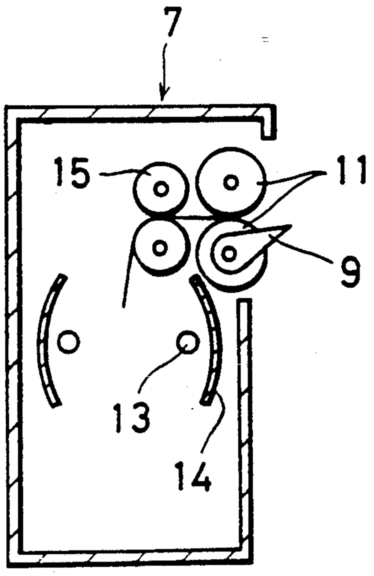

In the disposing means of the waste stencil of the present invention, heating rolls 12 may be provided at the rear of the waste stencil rolls 11 (non-heating rolls), as a heating means, as shown in FIG. 2, or conveyor rolls 15 may be provided at the rear of the waste stencil rolls 11, and heated by passing the waste stencil through between an infrared lamp 13 and a reflection plate 14 provided below the conveyor rolls 15, as shown in FIG. 3. The conveyor rolls 15 in FIG. 3 may be other means such as plate-form guide, conveyor, etc. as far as the means are those leading to heating means (infrared lamp in this case). Further, besides fixed type heating means such as infrared lamp, hot air may be blown toward the waste stencil.

EXAMPLE

The present invention will be described in more detail by way of Examples, but it should not be construed to be limited thereto.

EXAMPLE 1

A polypropylene non-woven fabric sheet (spun bond, PK-102 (tradename) made by Mitsui Petrochemical Industry Co., Ltd.) was used as a substrate, and a polyethylene terephthalate film (2 $\mu$m) was used as a thermoplastic resin film (heat sensitive film). The substrate was laminated with the heat-sensitive film, using a vinyl acetate type adhesive (KE-60 (tradename) made by Konishi Co., Ltd.) so as to give a weight after dried, of 1.0 g/m$^2$, to prepare a thermal stencil master sheet.

The resulting master sheet was subjected to stencil-making and printing, by means of a stencil-making and printing apparatus (RC-1150 (tradename) made by Riso Kagaku Co., Ltd.). As a result, the resulting master sheet was superior in the thermal stencil-making properties by means of thermal head, and printed matters obtained are faithful to manuscripts.

After the printing, the resulting used master sheet was passed through between a heating roll having a surface temperature of 170° C. and a counter roll, under a roll-pressing pressure of 10 g/cm$^2$ to dispose of it. The used master sheet was melted on the side of the substrate, and the film surface was in a state where the stencil image was erased.

EXAMPLE 2

A polypropylene non-woven fabric sheet (made by Nippon Koudoshi K.K., melt-blow process, basis weight 4 g/m$^2$) was used as a substrate, and a polyethylene terephthalate film (2 $\mu$m) was used as a heat-sensitive film. Lamination of the substrate with the film, and stencil-making and printing were carried out in the same manner as in Example 1.

After the printing, the used master sheet was passed through between a heating roll and a counter roll to dispose of it, in the same manner as in Example 1. The used master sheet was melted on the substrate side, and the film surface was in a state where the stencil image was erased.

EXAMPLE 3

A Japanese paper using Manila hemp fibers (basis weight: 10 g/m$^2$) was used as a substrate and a vinyl chloride-vinylidene chloride copolymer film was used as a heat-sensitive film. The lamination and stencil-making and printing were carried out in the same manner as in Example 1.

After completion of the printing, the resulting used master sheet was passed through between a heating roll and a counter roll to dispose of it, in the same manner as in Example 1. The film side of the used master sheet was melted and the stencil image was in a state where it was completely erased.

According to the apparatus for disposing of the waste stencil of the present invention, it is possible to uniformly heat the thermal stencil master sheet and subject the whole or a part of the master sheet to heat-shrinkage and/or melting; hence it is possible to completely erase the information on the stencil and also reduce its volume so that it is possible to increase the quantity of the waste stencil encased.

What we claim is:

1. An apparatus for disposing of a used thermal stencil master sheet, which comprises a stripping means for stripping a used thermal stencil master sheet wound up on a stencil body, a box for encasing the stripped master sheet, a feed means for feeding said master sheet to the inside of said box, and a heating means for heating said master sheet so that it is shrunk and/or molten within said box.

2. An apparatus for disposing of a used thermal stencil master sheet according to claim 1, said feed means is a pair of feed rolls provided at an opening of said box, said stripping means is a nail journaled to the axis of one of rolls, and said heating means is a heater provided at at least one of said feed rolls.

3. An apparatus for disposing of a used thermal stencil master sheet according to claim 1, wherein said heating means is a pair of rolls at least one of which has a heater, provided at the outlet side of said feed rolls.

4. An apparatus for disposing of a used thermal stencil master sheet according to claim 1, wherein said heating means comprises an infrared lamp and a reflection plate thereof which are provided below a guide means for guiding said thermal stencil sheet delivered from said feed rolls so as to pass in front of the infrared lamp.

* * * * *